UNITED STATES PATENT OFFICE.

PAUL EHRLICH AND PAUL KARRER, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ALKALI SALTS OF THE 3.3'-DIAMINO-4.4'-DIOXYARSENOBENZENE COMBINED WITH SILVER AND PROCESS OF MAKING SAME.

1,127,603.  Specification of Letters Patent.  Patented Feb. 9, 1915.

No Drawing.  Application filed January 27, 1914.  Serial No. 814,732.

*To all whom it may concern:*

Be it known that we, PAUL EHRLICH, M. D., professor of medicine, and PAUL KARRER, Ph. D., chemist, citizens of the Empire of Germany and Republic of Switzerland, respectively, residing at Frankfort-on-the-Main, Germany, have invented certain new and useful Improvements in Alkali Salts of the 3.3'-Diamino-4.4'-Dioxyarsenobenzene Combined with Silver and Processes of Making Same, of which the following is a specification.

We have found that new compounds can be obtained by combining 3.3'-diamino-4.4'-dioxyarsenobenzene with a silver salt in presence of alkalis. The new compounds are alkali salts of a complex compound which may be called "diaminodioxyarsenobenzene-silver." They form dark powders readily soluble in water with an alkaline reaction and insoluble in benzene and ether and are of great value for therapeutical purposes, particularly in the treatment of sleeping-sickness.

Example I: 5 parts by weight of 3.3'-diamino-4.4'-dioxyarsenobenzene hydrochlorid are dissolved in 100 parts of methyl-alcohol. This solution is mixed with 5 parts of 10 N. caustic soda lye and there is then added a solution of 1.8 parts of silver-nitrate in 100 parts of methyl alcohol. The liquid which assumes a dark-brown color is run into 500 cc. of absolute ether whereupon the new sodium salt is precipitated as black-brown flakes. It is very readily soluble in water with slightly alkaline reaction.

Example II: 5 grams of diaminodioxyarsenobenzene hydrochlorid are dissolved in 100 cc. of water; this solution is alkalized by adding 6 cc. of 10 N. caustic soda-lye and shaken without access of air for about ¼ hour with 1/100 molecular weight of a silver salt, for instance 3.1 grams of silversulfate. The silver salt becomes dissolved and the solution assumes a dark color. This solution is filtered and evaporated to dryness in a vacuum and thus yields a black powder readily soluble in water. The percentage of silver contained in the resulting preparations varies according to the quantity of silver salt used, as compounds containing one or two atoms of silver are formed.

Having now described our invention what we claim is:

1. As new products, alkali metal salts of the 3.3'-diamino-4.4'-dioxyarsenobenzene combined with silver bound in a complex form, being dark powders dissolving in water with alkaline reaction, insoluble in benzene and ether, and which change in the air and thereby become insoluble in water.

2. As a new product, the sodium salt of the 3.3'-diamino-4.4'-dioxyarsenobenzene combined with silver bound in a complex form, being a dark powder dissolving in water with alkaline reaction, insoluble in benzene and ether, and which changes in the air and thereby becomes insoluble in water.

3. The process, which consists in combining diaminodioxyarsenobenzene with silver salts in presence of an alkali.

4. The process, which consists in combining diaminodioxyarsenobenzene with silver nitrate in presence of caustic soda-lye.

In testimony whereof, we affix our signatures in presence of two witnesses.

PAUL EHRLICH.
PAUL KARRER.

Witnesses:
 JEAN GRUND,
 CARL GRUND.